United States Patent [19]

Saito

[11] Patent Number: 4,533,860
[45] Date of Patent: Aug. 6, 1985

[54] APPARATUS FOR ADJUSTING THE INCLINATION OF AUTOMOBILE HEADLAMP

[75] Inventor: Kunihiro Saito, Shiraokamachi, Japan

[73] Assignee: Ichikoh Industries Limited, Tokyo, Japan

[21] Appl. No.: 660,100

[22] Filed: Oct. 12, 1984

[30] Foreign Application Priority Data

Oct. 14, 1983 [JP] Japan .................................. 58-190903
Apr. 24, 1984 [JP] Japan .................................. 59-81141

[51] Int. Cl.³ ............................................. B60Q 1/06
[52] U.S. Cl. ................................ 318/673; 307/10 LS; 315/82; 315/77
[58] Field of Search ................... 318/467, 673; 307/9, 307/10 LS; 315/77, 82; 362/71

[56] References Cited

U.S. PATENT DOCUMENTS

| | | | |
|---|---|---|---|
| 2,240,397 | 4/1941 | Holleman | 307/10 LS |
| 2,372,438 | 3/1945 | Linder | 307/10 LS |
| 4,197,491 | 4/1980 | Cunnell et al. | 318/673 |
| 4,241,260 | 12/1980 | Botz et al. | 318/467 X |
| 4,276,581 | 6/1981 | Orii et al. | 362/71 X |
| 4,284,903 | 8/1981 | Mutschler et al. | 318/673 X |
| 4,486,818 | 12/1984 | Hashimoto et al. | 307/10 LS X |

Primary Examiner—William M. Shoop
Assistant Examiner—Bentsu Ro
Attorney, Agent, or Firm—Schwartz, Jeffery, Schwaab, Mack, Blumenthal & Evans

[57] ABSTRACT

An automobile headlamp inclination controller comprises a reduction gear group coupled between a headlamp and a d.c. motor. The d.c. motor has two windings, one for rotating a rotor in one direction and the other for rotating the rotor in an opposite direction. An angular position switch has a pair of fixed conductors and a plurality of trace conductors connected between d.c. motor and a manual operation switch for controlling the angular positions of the headlamp in response to the setting of the manual operation switch. The angular position switch has insulating portions corresponding to the angular positions of the headlamp. The insulating portions are used for stopping the d.c. motor when one of the trace conductors contacts with the insulating portion.

9 Claims, 16 Drawing Figures

POSITION (I)

POSITION (II)

POSITION (III)

| POSITION<br>CONTACT | O | I | II | III |
|---|---|---|---|---|
| A | B,C,D | B,C | B | NON |
| OFF STATE | E | D | C | B |
| F | NON | E | D,E | C,D,E |

APPARATUS FOR ADJUSTING THE INCLINATION OF AUTOMOBILE HEADLAMP

BACKGROUND OF THE INVENTION

1. Field of the invention

This invention relates to an apparatus for adjusting the inclination of an automobile headlamp, driven by a motor.

2. Description of the prior art

A conventional apparatus of this type is designed to obtain an adequate direction of an optical axis of a lamp (the direction of an optical beam emitted from a lamp) by compensating the variation in the optical axis of the lamp due to a heavy load carried in a vehicle and particularly in a truck for loading heavy luggages. When the optical axis of the lamp thus varies, a driver cannot attain a suitable visual field in driving the vehicle, or the vehicle emits glazed lights from the headlamps toward an opposed vehicle on a road, which might cause a very dangerous accident. The optical axis regulator of this sort is devised to solve the above-described problems.

In a conventional apparatus for adjusting the inclination of an automobile headlamp known per se such as a device disclosed in U.S. Pat. No. 4,241,260 specification, a drive motor is connected to a power source through an operation switch having a contact corresponding to the predetermined angular position of headlamps and a changeover switch for reversely rotating the rotating direction of the motor. The motor is driven by opening or closing of such switch means, and driven until the headlamps are directed to predetermined angular position. In this device, the more the number of the angular positions of the headlamp increases, the greater the number of contacts of the operation switch and the changeover switch increase, thereby resulting in the complexity in the structure of the switches.

In another conventional device disclosed in U.S. Pat. No. 4,197,491 specification, the headlamp can be moved from a certain angular position to other angular position by switching an operation switch in the same manner as the device disclosed in U.S. Pat. No. 4,241,260 specification, but it is necessary to independently provide switch means for reversely rotating the rotating direction of the motor. Thus, since a driver should operate both the operation switch and the changeover switch for reversely rotating the motor, a drawback that the operations of the switches become complicated arises.

SUMMARY OF THE INVENTION

An object of the present invention is to provide an optical axis regulator in which a driver can regulate the light bulb of a headlamp assembly to a predetermined angular position merely by operating a sole operation switch and a switch mechanism therefor is simple.

Another object of the present invention is to provide a device for regulating the tilting of a light bulb of a headlamp assembly for a vehicle having a linearly movable member mechanically coupled to the headlamp assembly and a reduction gear group mechanically coupled to the member and driven by a motor comprising:
  a power source having a negative terminal and a positive terminal,
  a DC electric motor having a first winding and a second winding wound on a stator or a rotor, the ends of the first and second windings being respectively connected to input terminals and output terminals formed on motor body, the output terminals being connected to the negative terminal of the power source and constructed to rotate the rotor in opposite directions when either input terminal of the first and second windings is electrically connected to the positive terminal of the power source,
  angular position switch member having a pair of conductor units respectively connected to the input terminals and spaced from each other and a plurality of contacts relatively movable and relative at 1:1 to a plurality of predetermined angular positions of the light bulb; said relative movement being carried out in response to the variation in the angular position of the light bulb, insulating portions formed corresponding to the angular positions of the light bulb on a trace formed by the plurality of contacts during the relative movement between a pair of conductor units, the other contact making contact with either one of the conductor units when one of the contacts makes contact with the corresponding insulating portion,
  operation switch members each having stationary contact group having a plurality of switch positions connected to the plurality of contacts of said angular position switch member and movable contacts contacted selectively with one of the stationary contacts and connected to the positive terminal of the power source;
  said operation switch member being switched from one switch position to other switch position, thereby electrically connecting the stationary contact corresponding to the other switch position to either of the conductor units of the angular position switch member, with the result that either of the first and second winding of the motor is energized to rotate the motor in the corresponding direction, thereby stopping the motor when the contact corresponding to the other switch position of the plurality of contacts of the angular position switch member makes contact with the corresponding insulating portion.

The above and other advantages, features and additional objects of the present invention will become apparent to those versed in the art upon making reference to the following detailed description and accompanying drawings.

BRIEF DESCRIPTION OF THE DRAWINGS

FIG. 1 is a front view showing a headlamp assembly, to which the present invention is applied;

FIG. 2 is a sectional view, taken along the line II—II in FIG. 1;

FIG. 3 is an enlarged sectional view partly omitted, taken along the line III—III in FIG. 1;

FIG. 4 is an enlarged sectional view of the essential part in FIG. 3;

FIG. 5 is a sectional view, taken along the line V—V in FIG. 4;

FIG. 6 is a control circuit diagram for regulating the optical axes of a pair of light bulbs;

FIG. 7 is a schematic view of a rotor of a motor used for the apparatus of the present invention;

FIG. 8 is a sectional view, taken along the line VIII—VIII in FIG. 7 illustrating two winding units;

FIG. 9 is an enlarged view showing the relationship between a conductor unit and a stationary contact on a rotary plate in FIG. 6;

FIGS. 11 through 14 are schematic views showing the positional relationships between the conductor unit and the stationary contact of an angular position switch member at the respective angular positions;

FIG. 15 is an explanatory view showing the connecting relationship between the conductor units and the stationary contact at the respective angular positions.

DESCRIPTION OF THE PREFERRED EMBODIMENTS

Figure 1:
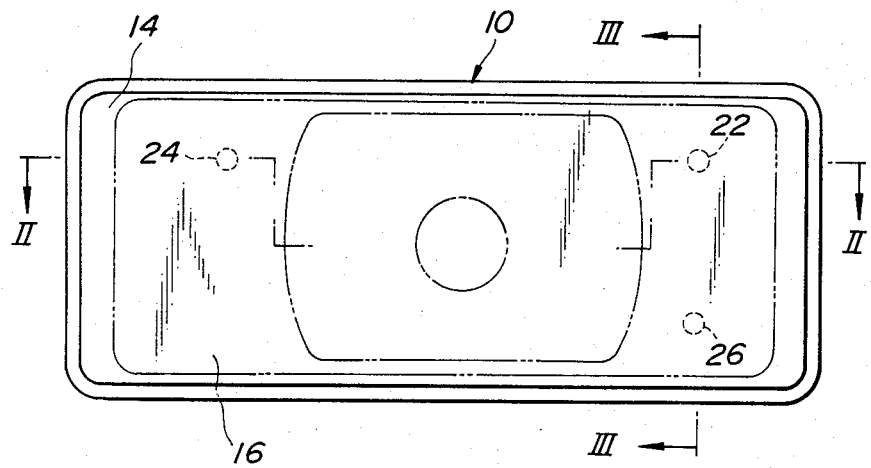
FIGS. 1 through 9 show an embodiment of an apparatus for adjusting the inclination of automobile headlamp according to the present invention.
Figure 2:
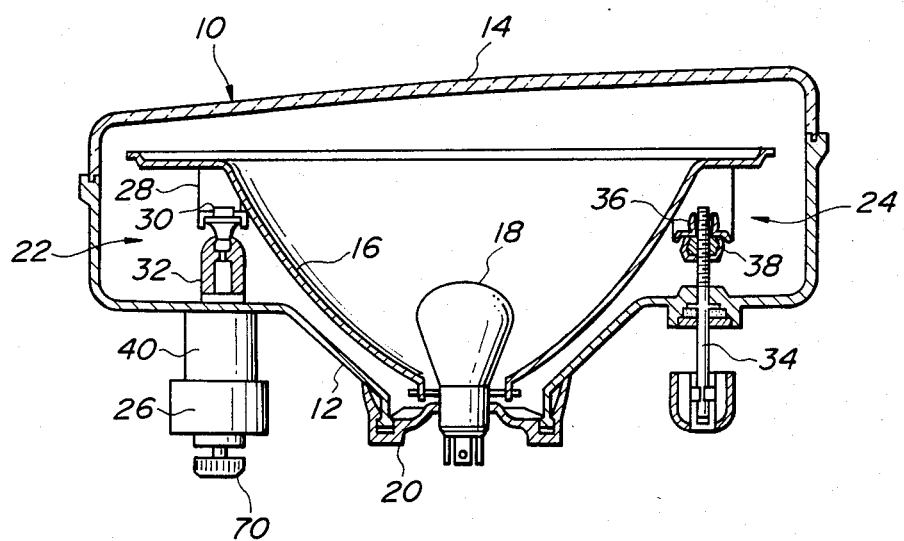
Figure 3:
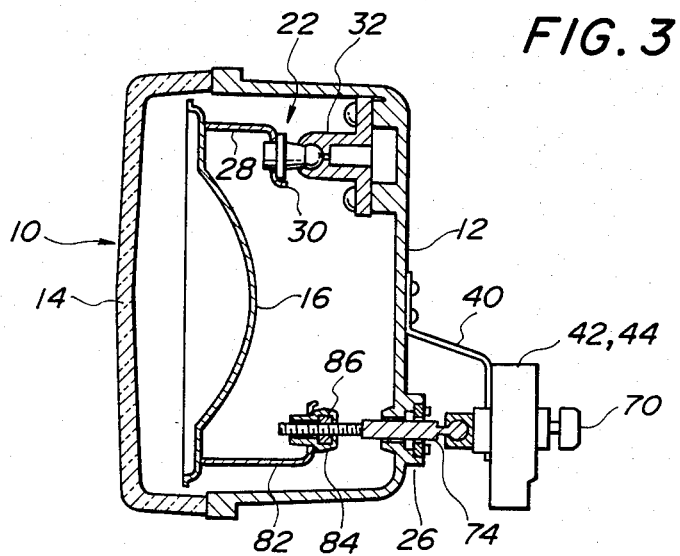
Figure 4:
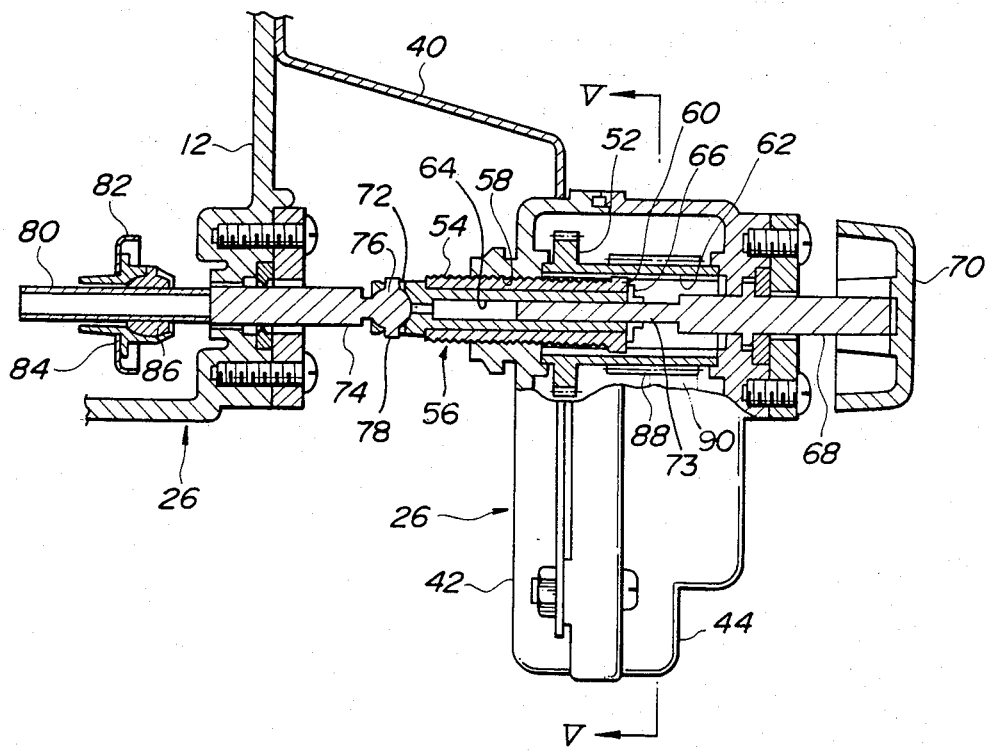

FIGS. 1 through 9 show an embodiment of an apparatus for adjusting the inclination of automobile headlamp according to the present invention. In the figures, a headlamp assembly 10 comprises a lamp body 12, a lens 14 covering the front surface of the lamp body 12, a reflector 16 tiltable to the lamp body 12, and a light bulb 18 fixedly mounted on the reflector 16.

A rubber cover 20 is arranged in the rear opening of the lamp body 12, and the base of the bulb 18 is externally exposed in contact with the cover 20.

The reflector 16 is supported at three points to the body 12. The supporting mechanism therefor has a fulcrum mechanism 22, an aiming mechanism 24, and an optical axis regulator 26 having aiming function and leveling function. The fulcrum mechanism 22 is composed of a pivot shaft 30 fixed to the mount 28 of the reflector 16 and a pivot holder 32 provided in the body 12 and engaged with the pivot shaft 30. The aiming mechanism 24 has an adjusting screw 34 rotatably retained at a predetermined position to the body 12 and a pivot ball 38 of a holder 36 provided at the mount 28 of the reflector 16, engaged with the screw 34. The aiming mechanism 24 is constructed to be able to tilt the reflector 16 around a vertical axis. The screw holder 36 and the pivot ball 38 are rotatably engaged to form a universal joint but prevented from relatively rotating to the screw holder 36 so that the ball 38 moves linearly upon rotating of the adjusting screw 34.

The optical axis regulator 26 is mounted through a bracket 40 on the body 12. More particularly, a motor 46, reduction gears 48 and 50 mechanically coupled to the motor 46 and a hollow gear 52 engaged in mesh with the gear 50 are arranged in a box formed by two housings 42, 44. The reduction gear 48 is composed of a worm gear fixed to the output shaft of the motor 46, and reference numeral 50 designates a wheel gear engaged in mesh with the worm gear. A threaded cylinder 56 formed with a threaded part 54 on the outer periphery thereof is arranged in the hollow gear 52, and engaged with a threaded hole 58 formed in the housing 42 through the threaded hole 58. A guide 60 formed in diameter larger than the diameter of the threaded part 54 is formed at one end of the cylinder 56, and slidably engaged with a guide groove 62 formed inside the hollow gear 52. Thus, the hollow gear 52 and the cylinder 52 are prevented from relatively rotating around the rotational axis. A piston rod 64 is arranged through the cylinder 56 inside the cylinder 56 in such a manner that the piston rod 64 and the cylinder 56 may not move in axial direction by a clip 66.

Figure 5:
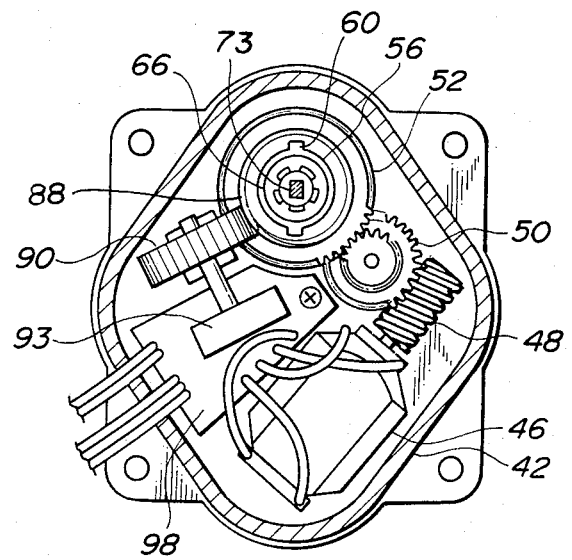
Figure 7:
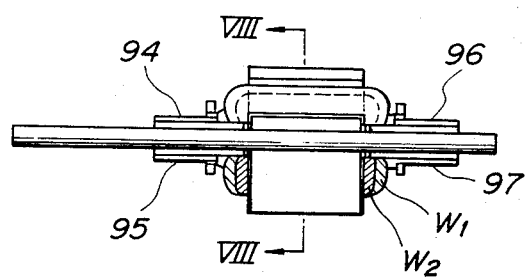

A manual operation shaft 68 is provided through the housing 44, slidably inserted at one end thereof into the piston rod 64, and fixed at the other end thereof by a knob 70. The shaft 68 is formed partly in square shape 73 of section as shown in FIG. 5, a square hole for passing the square shaft 68 is formed at the end of the piston rod 64, thereby preventing the rotation of the shaft 68 and the piston rod 64 around the rotational axis.

Therefore, when the cylinder 56 rotates, the cylinder 56 moves forwardly or backwardly in the axial direction since the threaded part 54 is engaged with the threaded hole 58 to move the piston rod 64 forwardly or backwardly. When the knob 70 is manually rotated, the piston rod 64 rotates to the cylinder 56.

A spherical seat 72 is formed on the end of the piston rod 64, and engaged with a spherical part 76 formed on an adjusting screw 74. A pin-shaped projection 78 is formed on the spherical part 76, and the seat 72 and the spherical part 76 act as a stopper to rotate around the rotational axis. A threaded part 80 formed on the outer periphery of the adjusting screw 74 is engaged in mesh with a pivot ball 86 of a holder 84 arranged on a mount 82 fixedly secured to the reflector 16.

The aiming adjustment carried out by the optical axis regulator thus constructed as described above in case that the headlamp 10 is mounted on an automotive body is achieved by manually rotating the knob 70. Only the piston rod 64 is rotated together with the shaft 68 by the rotation of the shaft 68, and the adjusting screw 74 is also rotated at the predetermined position. Since the ball 86 is engaged in mesh with the threaded part 80, the ball 86 is fed through threads by the rotation of the adjusting screw 74 to linearly move. Thus, the reflector 16, to which the bulb 18 is fastened, is tilted at the pivot of the fulcrum mechanism 22 as a fulcrum, thereby performing the initial optical axis regulation.

The leveling adjustment of the direction of the optical axis which varies due to the loaded luggages on the vehicle is carried out by rotating the hollow gear 52 by the motor 46 and the reduction gears 48, 50, thereby rotating the cylinder 56 provided with the threaded part 54 on the outer periphery upon rotating of the gear 52 in the axial direction forwardly or backwardly. The piston rod 64 slides the part 73 of the shaft 68 in nonrotatable state upon forwardly or backwardly movement of the cylinder 56 to move the adjusting screw 74, thereby tilting the reflector 16 fastened with the bulb 18.

Figure 8:
Figure 6:
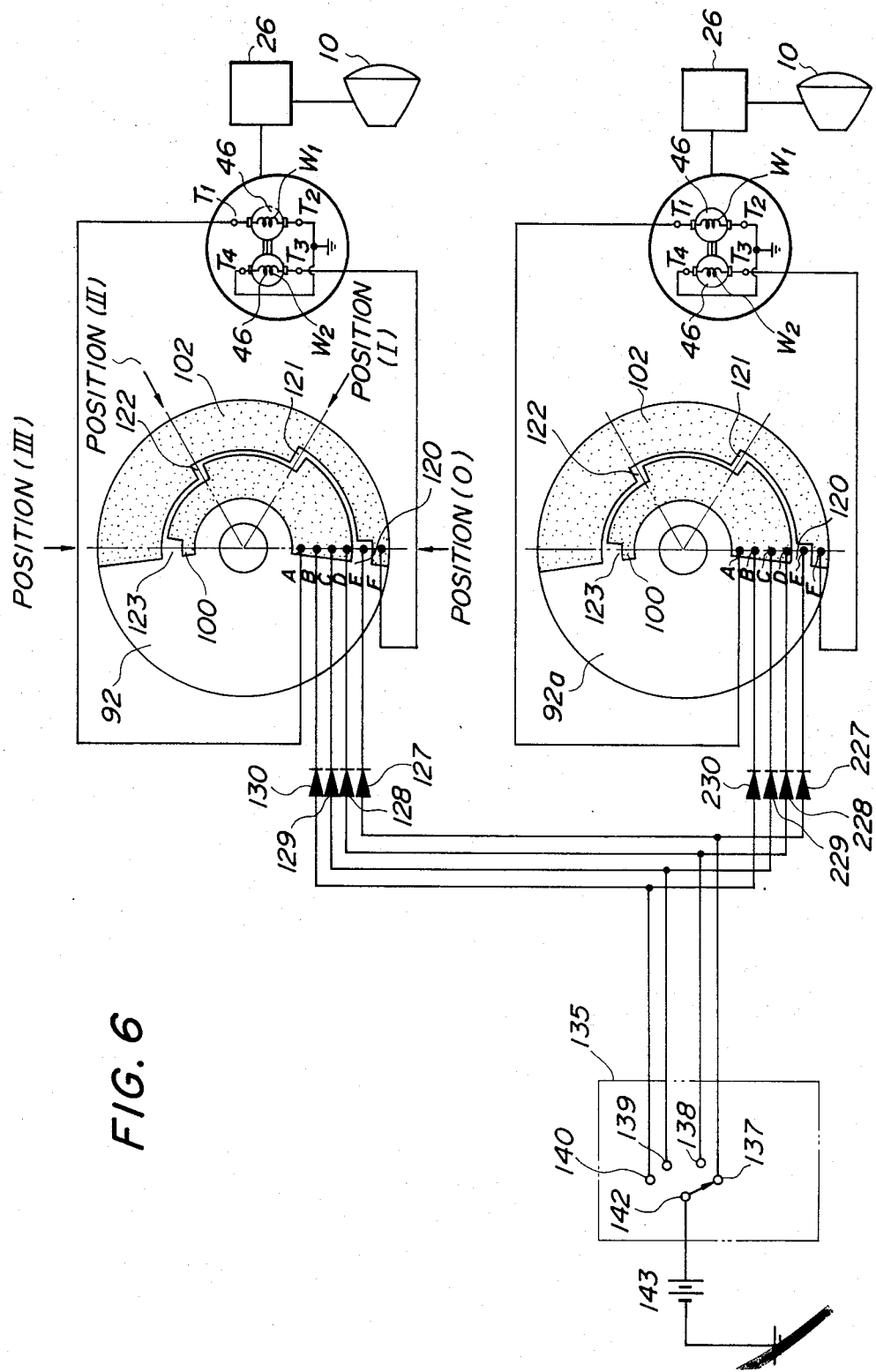
Figure 9:
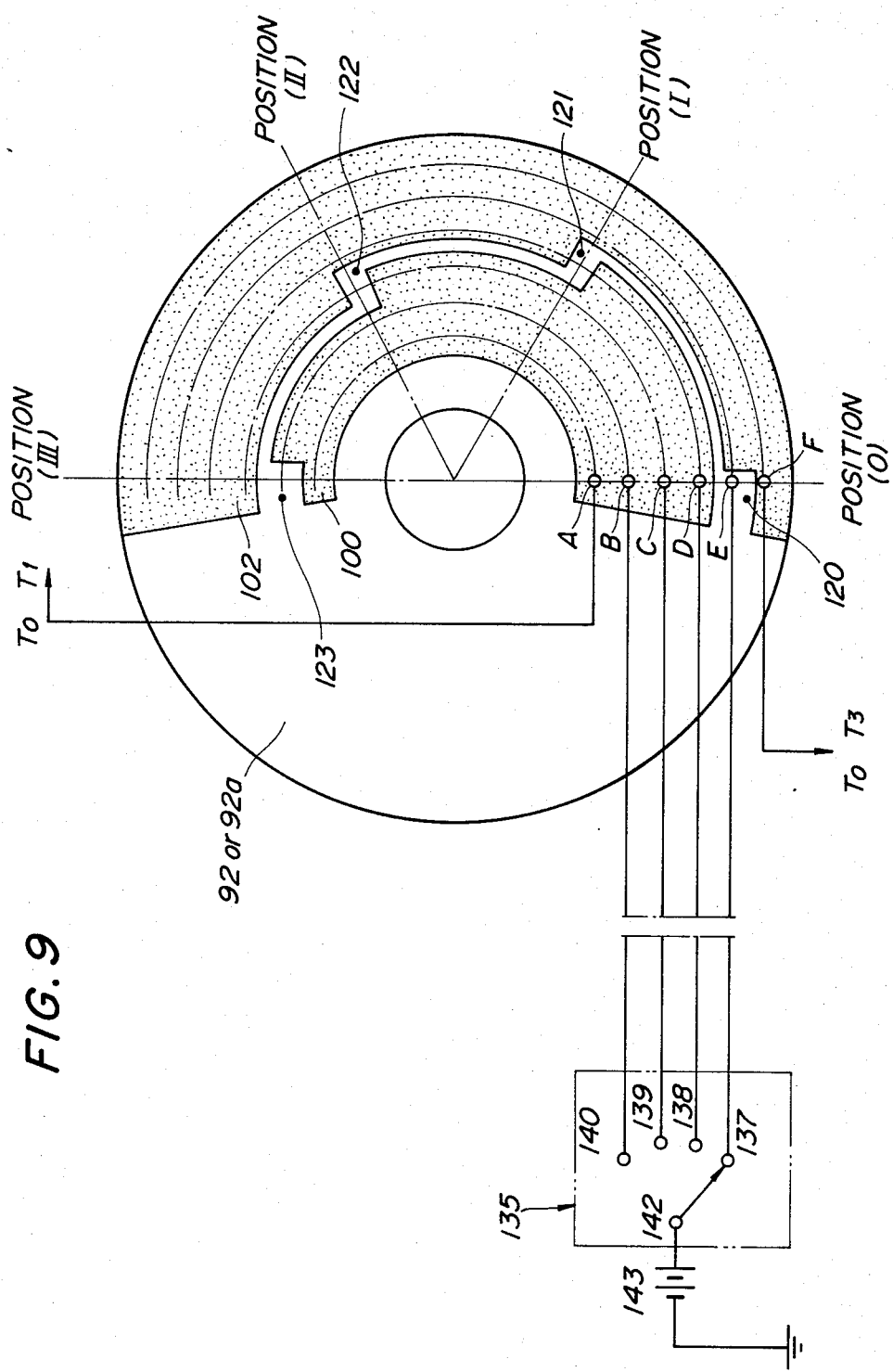

In the device according to the present invention, a worm 88 is formed on the outer periphery of the hollow gear 52, and a worm wheel 90 engaging in mesh with the worm 88 is arranged in the housing. In the worm wheel 90, a rotational shaft is fastened to the center of a rotary plate 92 formed as shown in FIG. 6. In FIG. 6, a control circuit for regulating the tilting positions of the light bulbs 18 of a pair of right and left headlamp assemblies 10 is shown. A pair of right and left light bulbs 18 are tilted by normally or reversely rotating a pair of motors 46, thereby moving forwardly or backwardly the adjusting screws 74 of a pair of optical axis regulators 26. The motor 46 according to the present invention has two windings $W_1$, $W_2$ on a rotor (which may be a stator instead), and both ends of the windings are respectively connected to terminals $T_1$, $T_2$ and $T_3$, $T_4$ formed on the motor body through commutators 94, 95 and 96, 97. The winding $W_2$ is wound inside the winding $W_1$ as shown in FIG. 8 in such a manner that the winding directions of the windings are the same. The terminals $T_1$, $T_3$ construct input terminals, and the terminals $T_2$, $T_4$ construct output terminals. The terminals are constructed that the output shaft of the motor is rotated clockwise or counterclockwise when the winding $W_1$ or $W_2$ is energized by connecting either the terminal $T_1$ or $T_3$ to the other positive polarity of a power source in the state that the terminals $T_2$ and $T_4$ are simultaneously connected to negative polarity of the power source. In the embodiment described above, the output terminals $T_2$ and $T_4$ are grounded, and the input terminals $T_1$ and $T_3$ are connected to the positive terminal of the power source through an angular position switch and an operation switch to be described later. When the input terminal $T_1$ becomes positive potential, the rotational shaft of the motor rotates clockwise, and when the input terminal $T_3$ becomes positive potential, the shaft of the motor rotates counterclockwise.

The input terminal $T_1$ connected with the winding $W_1$ is connected to a conductor unit 100 formed on an insulated rotary plate 92 through a contact A, and the input terminal $T_3$ connected with the winding $W_2$ is similarly connected to a conductor unit 102 through contact F. The conductor units 100 and 102 are spaced on the surface of one side of the rotary plate 92. The conductor units 100 and 102 may be formed by processing or etching a printed circuit board. The rotary plate 92 is fastened at the center thereof to the rotational shaft of the worm wheel 90 engaging in mesh with one worm 88 of reduction gear group as described above to rotate in response to the tilting of the light bulb 18 in a range from the minimum angular position to the maximum angular position. In the embodiment described above, the rotary plate 92 is constructed to rotate substantially at 180° in response to the predetermined tiltable range of the light bulb 18, the position (0) is defined in response to the minimum angular position of the light bulb 18 and the position (III) is defined in response to the maximum angular position. Thus, the rotary plate 92 is provided with the position (I) and the position (II) substantially at every 60°.

Stationary contacts B, C, D and E arranged to contact with any of the conductors 100 and 102 are arranged together with the contacts A and F described above in a casing 93 for containing the rotary plate 92. The casing 93 (See FIG. 5.) is fastened onto a printed circuit board 98 formed with the control circuit. The stationary contact E is disposed in noncontact with any of the conductor units when the rotary plate 92 is disposed at the position corresponding to the angular position (0) of the light bulb 18. Similarly, the contacts D, C and B are not contact with any of the conductor units when the rotary plate 92 is respectively disposed at the positions (I), (II) and (III). Therefore, in the embodiment described above, the conductor unit 100 is constructed to continuously dispose part of a sector shape which decreases in the diameter stepwise from the position (0) to the position (III) toward the central axis direction. On the contrary, the conductor unit 102 is constructed to continuously dispose part of a sector shape which increases in the diameter stepwisely from the position (0) to the position (III) toward the central axis direction outside the conductor unit 100. The conductor unit 100 is stepwisely reduced in diameter at the positions corresponding to the positions (I), (II) and (III), while the conductor unit 102 is stepwisely increased in diameter at the positions corresponding to the positions (0), (I) and (II), and insulating portions 120, 121, 122 and 123 are respectively formed corresponding to the angular positions (0), (I), (II) and (III) between the conductor unit 100 and the conductor unit 102. The stationary contact D makes contact with the insulating portion 121 at the angular position of the rotary plate corresponding to the position (I), makes contact with the conductor unit 100 at the angular position from the position (0) to the position (I), and makes contact with the conductor unit 102 at the angular positions from the position (I) to the position (III). Similarly, the stationary contact C makes contact with the insulating portion 122 at the angular position corresponding to the position (II), makes contact with the conductor unit 100 from the position (0) to the position (II), and makes contact with the conductor unit 102 from the position (II) to the position (III). The stationary contacts E and B respectively make contact with the insulating portions 120 and 123 at the positions (0) and (III), and make contact with the conductor units 102 and 100 between the position (0) and the position (III).

The stationary contacts E, D, C and B are wired through diodes 127, 128, 129 and 130 to the stationary contacts 137, 138, 139 and 140 of a rotary switch 135. The diodes are forward in the direction from the stationary contacts of the rotary switch 135 toward the stationary contacts of the rotary plate side, and arranged on the printed circuit board 98. The rotary switch 135 is arranged on a dashboard in the vehicle, and the movable contact 142 thereof is selectively connected to any one of the stationary contacts 137, 138, 139 and 140 by switching the rotary switch. The movable contact 142 is connected to the positive side of a power source 143. In the embodiment described above, the same rotary plate 92a, the same conductor units 100, 102, stationary contacts A, F and B, C, D, E are provided to regulate the tilting of a pair of right and left light bulbs (as shown in the lower portion in FIG. 6). The stationary contacts E, D, C and B of the rotary plate 92a side are respectively connected through diodes 227, 228, 229 and 230 to the stationary contacts 137, 138, 139 and 140 of the above-described rotary switch 135. The directions of the diodes 227 through 230 are similar to the diodes 127 through 130. In other words, the stationary contacts E, D, C, B of the rotary plates 92, 92a are connected through the diodes 127 through 130 and 227 through 230 to the corresponding stationary contacts 137 through 140 of the rotary switch 135. The stationary contacts 137 through 140 of the rotary switch 135 are operation switches for designating the angular positions (0) through (III) of the light bulb, and a drive can simultaneously tilt a pair of right and left light bulbs to the desired angular position by switching one of these operation switches in the compartment of the vehicle.

The state shown in FIG. 6 shows that the rotary plates 92, 92a are disposed at the positions corresponding to the minimum angular position (0) of the light bulbs 18. When the movable contact 142 is connected to the stationary contact 138 by switching the rotary switch 135 from this state, the light bulb 18 is designated to the angular position (I). Then, the stationary contact 138 is connected to the stationary contact D, the conductor unit 100, the stationary contact A, the input terminal $T_1$, the winding $W_1$ and the terminal $T_2$ of the rotary plate side, thereby forming a closed circuit, and the motor 46 rotates clockwise. Consequently, the rotary plates 92, 92a rotate clockwise.

The rotations of the rotary plates 92 and 92a stop when the stationary contact D makes contact with the insulating portion 121 corresponding to the position (I). Further, when the movable contact 142 of the rotary switch 135 is switched to make contact with the stationary contact 139, the stationary contact C of the rotary plate side makes contact with the conductor unit 100. Thus, the winding $W_1$ is energized through the terminal $T_1$ of the motor 46, and the rotary plates 92 and 92a are rotated clockwise similarly. When the stationary contact C makes contact with the insulating portion 122 corresponding to the position (II), the rotation of the rotary plate 92 stops. The two motors 46 are rotated so that the light bulb 18 occupies the predetermined angular positions (I) and (II) by sequentially contacting the movable contact 142 of the rotary switch 135 from the stationary contact 137 to the stationary contacts 128 and 139 (by sequential switching) as described above.

On the contrary, when the state that the movable contact 142 of the rotary switch 135 makes contact with the stationary contact 139 (at the position (II)) is switched to that state that the movable contact 142 makes contact with the stationary contact 137, one closed circuit is formed by the power source 142, the rotary switch 142, the stationary contact E, the conductor unit 102, the terminal $T_3$, the winding $W_2$ and the terminal $T_4$ since the stationary contact E of the rotary plate side corresponding to the stationary contact 137 makes contact with the conductor unit 102, and the two motors 46 are driven to rotate the rotary plates 92 and 92a counterclockwise. When the insulating portion 120 is then moved to the position of the stationary contact E, the closed circuit is opened to stop the two motors 46. In other words, the angular position of the light bulb can be simply regulated from the position (II) to the position (0) by switching the movable contact 142 of the rotary switch 135 from the stationary contact 139 to the stationary contact 137 (by reverse switching). As described above, the light bulb can be stepwisely regulated at the optical axis in the range of the angular positions (0) to (III) by forwardly or reversely switching sequentially the rotary switch 135, and the driver can sufficiently operate only the rotary switch.

In the embodiment described above, two angular positions are provided between the minimum angular position and the maximum angular position of the light bulb. However, it is also possible to set a number of angular positions within the spirit and scope of the present invention. Further, even when a number of angular positions are set in advance, the contacts of the number corresponding to the number of the angular positions may be provided in the relationship of 1:1 between the stationary contact of the operation switch or rotary switch 135 and the stationary contact of the rotary plate side, and the structure of the contacts is therefore extremely simple. Since diodes are arranged between the stationary contact group of the rotary plate side and the stationary contacts of the operation switch for selecting the position, a trouble due to the difference of the rotating speeds between the two rotary plates 92 and 92a can be avoided even if two motors rotate at different speeds.

Figure 10:
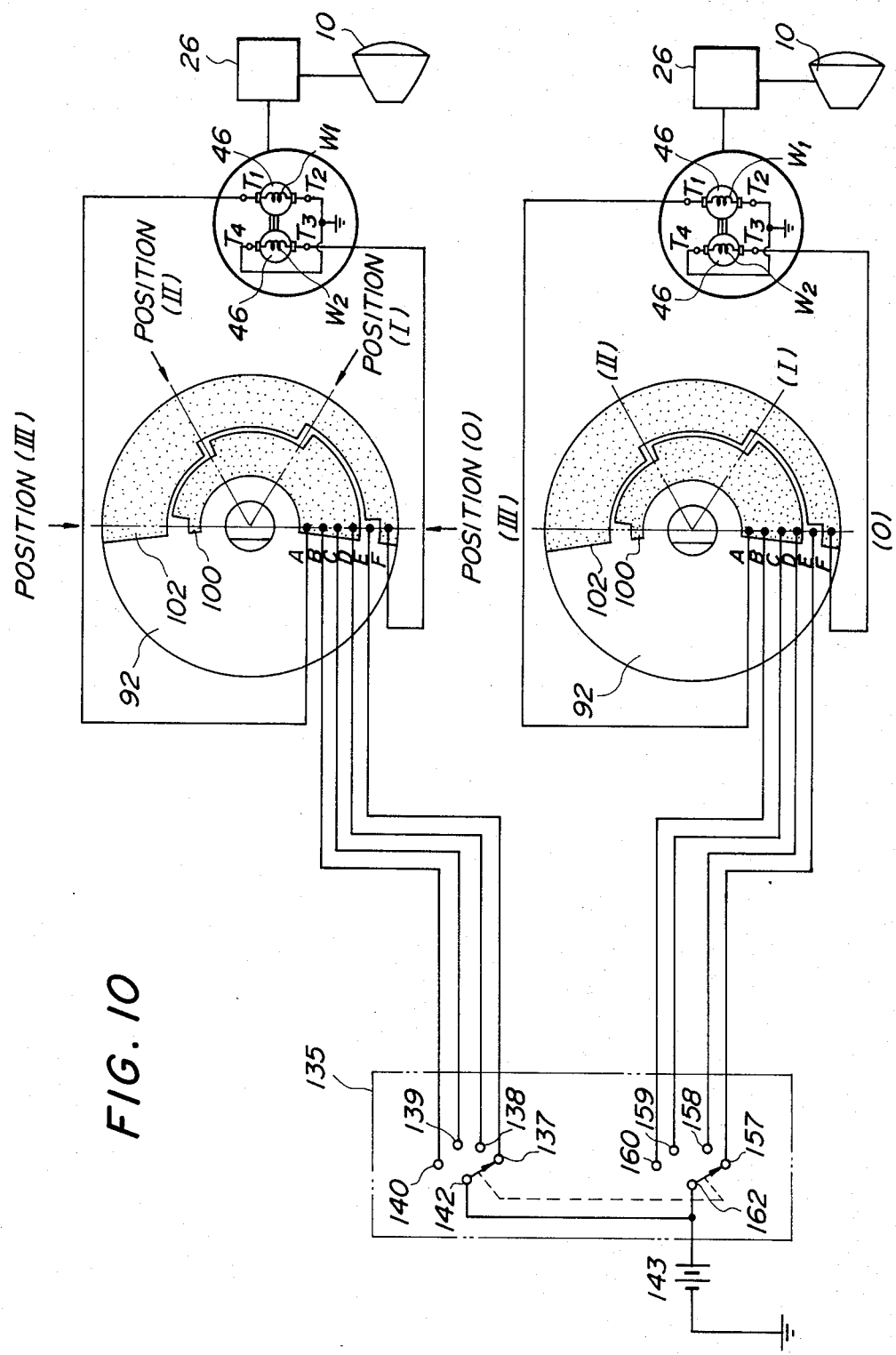
FIG. 10 is a circuit diagram showing a modified example of the control circuit.

FIG. 10 shows a modified example of a control circuit of the first embodiment according to the present invention illustrating the example in which diodes 127 through 130 and 227 through 230 can be eliminated in the previous embodiment. In FIG. 10, two-stage rotary switch 135 is employed, the stationary contacts 137 through 140 and 157 through 160 respectively indicate the angular positions (0) through (III) of a pair of light bulbs, and the movable contacts 142 and 162 may be interlocked and switched. The movable contacts 142 and 162 are connected to the positive side of a power source 143.

Figure 11:
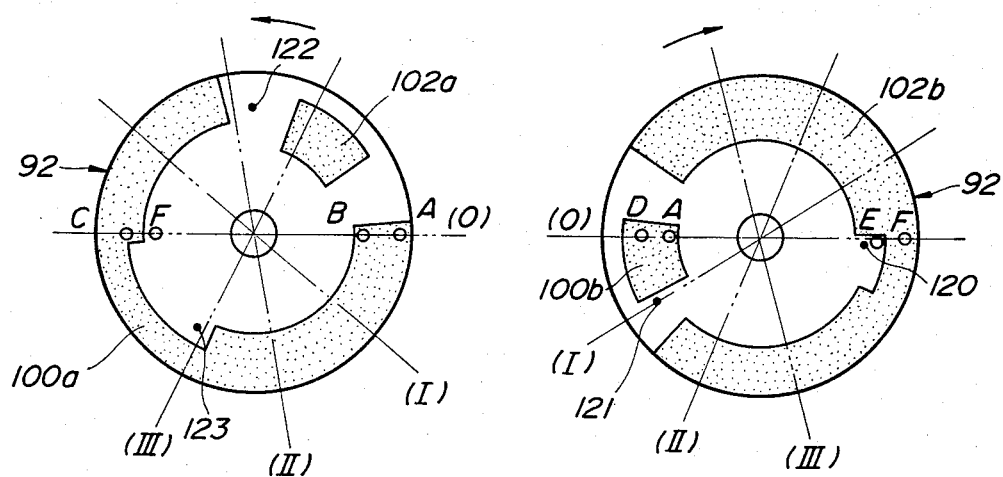
FIGS. 11 through 15 show another embodiment of an angular position switch member in an optical axis regulator according to the present invention.
Figure 12:
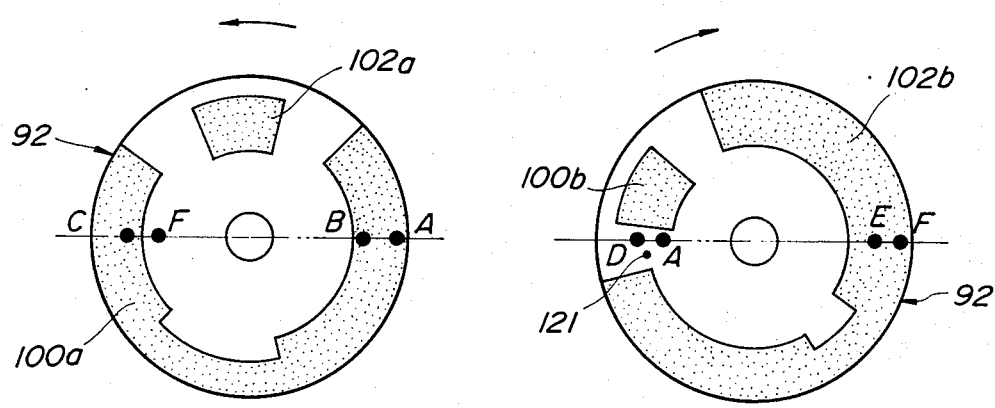
Figure 13:
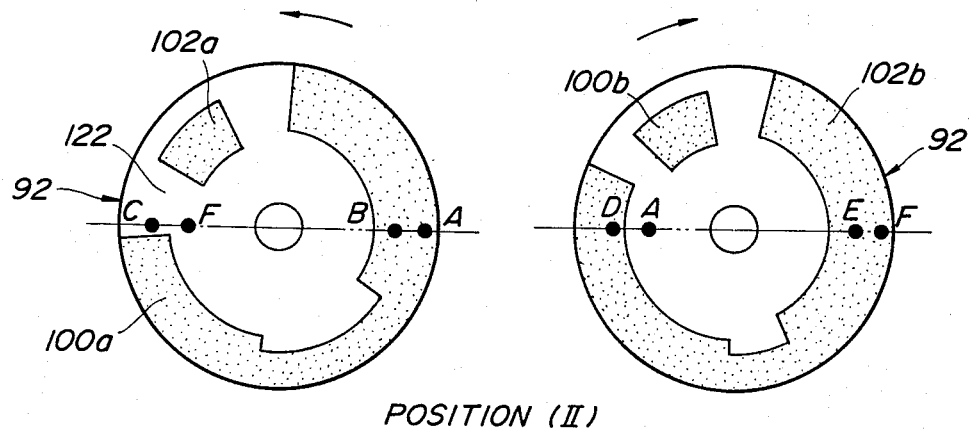
Figure 14:
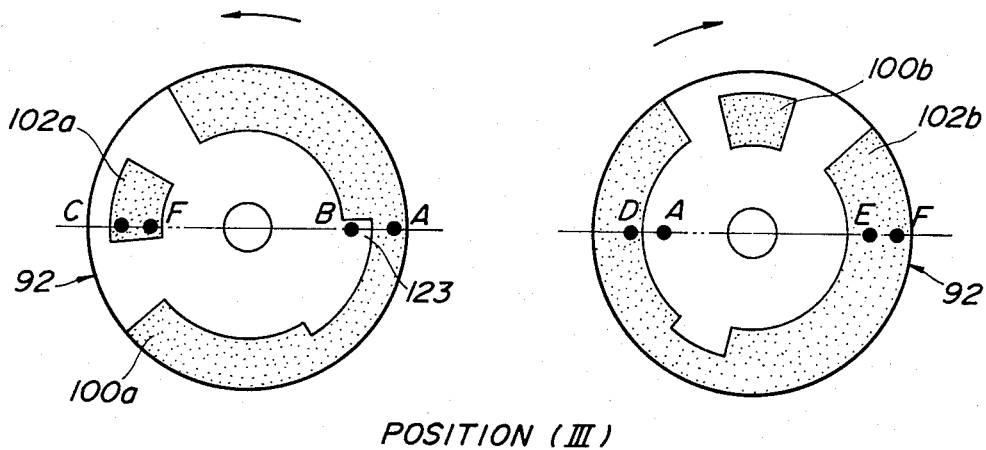

In FIGS. 11 through 15, another example of angular position switch member in which conductor units 100 and 102 are formed over both the front and back surfaces of a rotary plate 92 is shown, wherein the same numerals as those in the first embodiment depict the same or equivalent parts. In this embodiment, the conductor unit 100 has a C-shaped conductor unit 100a formed on the front surface (at the left side of the figures) of a disk 92, and a small conductor unit 100b of sector shape formed on the back surface (at the right side of the figures), and the conductor unit 102 has a small conductor unit 102a of a sector shape formed on the front surface of the disc 92 and a C-shaped conductor unit 102b formed on the back surface. Stationary contacts A, B, C, F are arranged to make contact with the conductor units 100a, 102a to slide on the front surface while contacting the front surface, and stationary contacts A, D, E, F are arranged to make contact with the conductor units 100b, 102b to slide on the back surface while contacting the back surface. The stationary contacts A, F on the front surface are connected to the stationary contacts A, F on the back surface. The stationary contact A is connected to the input terminal $T_1$ of the motor 46 and the stationary contact F is connected to the input terminal $T_3$ of the motor 46 in the same manner as the first embodiment. The angular positions (0) to (III) of the light bulb 18 are set as shown in FIG. 11, and the rotary plate 92 in FIG. 11 is disposed at the position corresponding to the angular position (0). At this time, the stationary contact A is connected to the stationary contacts B, C and D, the stationary contact E makes contact with the insulating portion 120, and the stationary contact F is connected to the conductor unit 102b. When the movable contact 142 is connected to the stationary contact 138 by switching the rotary switch 135 from this state, the motor 46 is rotated clockwise since the stationary contact 138 is connected to the stationary contact D at the rotary plate side, the front side of the rotary plate 92 is rotated counterclockwise as designated by an arrow, and the back side is rotated clockwise. As shown in FIG. 12, the stationary contacts A, D which are contacted with the conductor 100b of the back side of the rotary plate are separated from the conductor unit 100b, and when the stationary contact D makes contact with the insulating portion 121, the control circuit is closed to stop the rotation of the motor 46. More specifically, the rotary plate 92 is rotated to the position corresponding to the angular position (I) of the light bulb, and stopped at the position (FIG. 12). Similarly, when the movable contact 142 is contacted with the stationary contact 139 by switching the rotary switch 135 from this state, the motor 46 drives to rotate the rotary plate 92 further in the direction as designated by the arrow, the stationary contact C is separated from the conductor unit 100a and the rotation continues until making contact with the insulating portion 122 since the movable contact 139 is connected to the stationary contact C at the rotary plate side. In other words, the rotary plate 92 and hence the motor 46 is rotated to the position corresponding to the angular position (II) of the light bulb, and stopped at the position (FIG. 13). It is understood that the tilting of the light bulb 18 to the angular position (III) is similarly carried out and the rotary plate 92 and hence the motor 46 is stopped at the position as shown in FIG. 14. In the embodiment described above, the rotary switch is sequentially switched to the angular positions (0) to (III). However, the rotary plate 92 and hence the motor 46 may be stopped at the desired angular position even if the rotary switch is switched from the angular position (0) directly to the angular position (II) or (III).

Figures 15, 16:
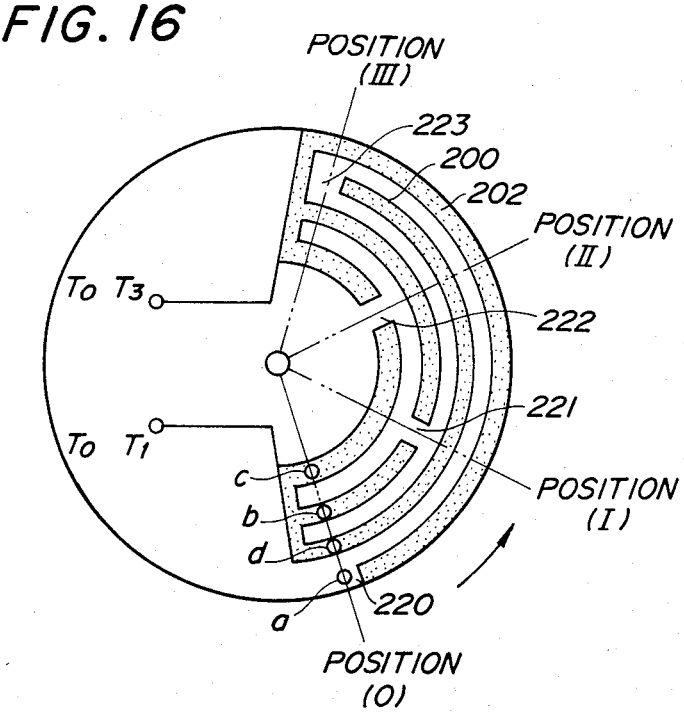
FIG. 16 is a schematic view showing still another embodiment of an angular position switch member in an optical axis regulator according to the present invention.

When the headlamp is tilted from the angular position (III) to the angular position (I), it is understood from the following description that the headlamp can be tilted to the angular position (I) simply by switching the rotary switch 135. As shown in FIG. 14, the stationary contacts C, D, E are connected to the stationary contact F and hence the conductor unit 102b at the angular position (III). The movable contact 142 of the rotary switch 135 is contacted from this state with the stationary contact 128 corresponding to the angular position (I). Then, since the stationary contact 138 is connected to the contact D of the rotary plate side, the contact 138 is eventually connected to the stationary contact F to rotate the motor 46 counterclockwise. In the figures, the rotary plate 92 starts rotating in opposite direction of the arrow. Then, the stationary contact D separates from the conductor unit 102b, and the rotary plate rotates until making contact with the insulating portion 121, and stops at the position (FIG. 12). FIG. 15 shows the connecting relationship between the stationary contact A connected to the input terminal $T_1$ of the motor 46 and the stationary contact F connected to the terminal $T_3$, and the other stationary contacts B, C, D, E at the angular positions (0) to (III). The operation of the rotary plate in this embodiment can be understood by aiding this table.

The rotary disk and the conductor units in this embodiment are formed similarly to the above-described embodiments by processing the printed circuit board and etching, the stationary contact group contacted with the conductor units are formed of thin conductor metal pieces having elasticity, and pressed to the conductor units by the elastic forces of themselves.

In FIG. 16, two conductor units 200 and 202 arranged concentrically are formed on a stationary disk, and slide contacts a, b, c, d corresponding to the angular positions (0) through (III) of the light bulb 18 are provided in another switch mechanism. These conductor units 200 and 202 are respectively connected to the input terminals $T_1$ and $T_3$ of the motor 46, and the slide contacts a, b, c, d are respectively connected to the stationary contacts 137, 138, 139, 140 of the rotary switch 135. The slide contacts a, b, c, d are provided on a member rotating in response to the tilting of the light bulb such as a rotary disk fastened to one rotational shaft of a worm, and the stationary disk formed with the conductor units 200 and 202 is preferably arranged on the position opposite to the rotary disk.

The fastened conductor units 200 and 202 are respectively constructed to be formed of three conductor passages arranged concentrically and connected to the three conductor passages arranged concentrically. The conductor passages are arranged on a trace for moving the slide contacts a, b, c, d, and insulating portions 220, 221, 222 and 223 are respectively formed on the trace for moving the slide contacts a, b, c, d. The insulating portions are corresponded to the predetermined angular positions (0) through (III) of the light bulb 18. The operation of the switch mechanism in this embodiment is the same as that of the switch mechanism in the first embodiment, and will be omitted for the description.

What is claimed is:

1. An apparatus for adjusting the inclination of automobile headlamp having a linearly movable member mechanically coupled to the headlamp assembly and a reduction gear group mechanically coupled to the member and driven by a motor comprising:
    a power source having a negative terminal and a positive terminal,
    a DC electric motor having a first winding and a second winding wound on a stator or a rotor, the ends of the first and second windings being respectively connected to input terminals and output terminals formed on motor body, the output terminals being connected to the negative terminal of the power source and constructed to rotate the rotor in opposite directions when either input terminal of the first and second windings is electrically connected to the positive terminal of the power source,
    angular position switch member having a pair of conductor units respectively connected to the input terminals and spaced from each other and a plurality of contacts relatively movable and relative at 1:1 to a plurality of predetermined angular positions of the light bulb, said relative movement being carried out in response to the variation in the angular position of the light bulb, insulating portions formed corresponding to the angular positions of the light bulb on a trace formed by the plurality of contacts during the relative movement between a pair of conductor units, the other contact making contact with either one of the conductor units when one of the contacts makes contact with the corresponding insulating portion,
    operation switch members each having stationary contact group having a plurality of switch positions connected to the plurality of contacts of said angular position switch member and movable contacts contacted selectively with one of the stationary contacts and connected to the positive terminal of the power source;
    said operation switch member being switched from one switch position to other switch position, thereby electrically connecting the stationary contact corresponding to the other switch position to either of the conductor units of the angular position switch member, with the result that either of the first and second winding of the motor is energized to rotate the motor in the corresponding direction, thereby stopping the motor when the contact corresponding to the other switch position of the plurality of contacts of the angular position switch member makes contact with the corresponding insulating portion.

2. The apparatus as claimed in claim 1, further comprising:
    a second DC electric motor for driving a second linearly movable member mechanically coupled to a second headlamp assembly through a second reduction gear group thereby regulating the tilting of the light bulb of the second headlamp assembly, having a first winding and a second winding wound on a stator or a rotor, the ends of the windings being respectively connected to input terminals and output terminals formed on the motor body, the output terminals being connected to the negative terminal of the power source, constructed to rotate the rotor in opposite directions when either input terminal of the first and second winding is electrically connected to the positive terminal of the power source, second angular position switch member having a pair of conductor units respectively connected to the input terminals and spaced from each other and the same number as the contacts of the first angular position switch members of plural contacts relatively movable and relative at 1:1 to a plurality of predetermined angular positions of the light bulb of the second headlamp assembly said relative movement being carried out in response to the variation in the angular position of the light bulb of the second headlamp assembly, insulating portions formed corresponding to the angular positions of the light bulb of the headlamp assembly on a trace formed by the plurality of contacts during the relative movement between a pair of conductor units, the other contact making contact with either one of the conductor units when one of the contacts makes contact with the corresponding insulating portion, second operation switch members each having stationary contact group having a plurality of switch positions connected to the plurality of contacts of said second angular position switch member and movable contacts contacted selectively with one of the stationary contacts and connected to the positive terminal of the power source; and means for interlocking the movable contacts of the first operation switch member and the second operation switch member, said first and second operation switch means being simultaneously switched by said interlocking means from one switch position to other switch position, thereby electrically connecting the respective stationary contact corresponding to the other switch position to either of the conductor units of the first and second angular position switch members, with the result that either of the first and second winding of the first and second motors are energized to rotate the first and second motors in the corresponding direction, thereby stopping the rotations of the first and second motors when the contact corresponding to the other switch position of the plurality of contacts of the first and second angular position switch members make contact with the corresponding insulating portions.

3. An apparatus for adjusting the inclination of automobile headlamp having a pair of linearly movable members respectively coupled to the light bulb of the headlamp assemblies and reduction gear group mechanically coupled to the movable members and driven by motors, comprising:

a power source having a negative terminal and a positive terminal, first and second DC electric motors each having a first winding and a second winding wound on a rotor, the ends of the first and second windings being respectively connected to input terminals and output terminals formed on motor bodies, the output terminals being connected to the negative terminal of the power source and constructed to rotate the rotors in opposite directions when either input terminal of the first and second windings of each motor is electrically connected to the positive terminal of the power source, first and second angular position switch members each having a pair of conductor units respectively connected to the input terminals of the first and second motors and spaced from each other and a plurality of contacts relatively movable and relative at 1:1 to a plurality of predetermined angular positions of the light bulbs of the first and second headlamp assemblies;

said relative movement being carried out in response to the variation in the predetermined angular position of the light bulb of the first and second headlamp assemblies, insulating portions formed corresponding to the angular positions of the light bulbs on a trace formed by the plurality of contacts during the relative movement between a pair of conductor units, the other contact making contact with either one of the conductor units when one of the contacts makes contact with the corresponding insulating portion, operation switch members having stationary contacts respectively connected to the corresponding contacts of the first and second angular position switch members and movable contacts selectively contacted with one of the stationary contacts and connected to the positive terminal of the power source, and diode group respectively connected between the corresponding contacts of the first and second angular position switch members and the stationary contacts of the operation switch members, each diode arranged forwardly in a direction from the latter contact to the former contact;

said operation switch member being switched from one switch position to other switch position, thereby electrically connecting the stationary contacts corresponding to the other switch position to either of the pair of the conductor units of the first and second angular position switch members through either of the diodes group, with the result that either of the first and second winding of the first and second motors are energized to rotate the first and second motors in the corresponding direction, thereby stopping the first and second motors when the contact corresponding to the other switch position of the plurality of contacts of the first and second angular position switch members makes contact with the corresponding insulating portion.

4. The apparatus as claimed in claim 2, wherein the contacts relative to the minimum angular position or maximum angular position of the light bulb of each headlamp assembly of a plurality of contacts of the angular position switch members make contact with any of the pair of the conductor units except when respectively making contact with the corresponding insulating portions, and the contacts corresponding to the angular positions disposed between the minimum angular position and the maximum angular position separate from one of the conductor units and make contact with the other thereof at the contact with the corresponding insulating portions as a boundary.

5. The apparatus as claimed in claim 3, wherein the contacts relative to the minimum angular position or maximum angular position of the light bulb of each headlamp assembly of a plurality of contacts of the angular position switch members make contact with any of the pair of the conductor units except when respectively making contact with the corresponding insulating portions, and the contacts corresponding to the angular positions disposed between the minimum angular position and the maximum angular position separate from one of the conductor units and make contact with the other thereof at the contact with the corresponding insulating portions as a boundary.

6. The apparatus as claimed in claim 4, wherein the angular position switch members comprises plane contacts formed of a plurality of conductor units formed on each rotary disk rotating in response to the rotation of the reduction gear, and a plurality of stationary contacts arranged to make contact with the plane contacts.

7. The apparatus as claimed in claim 5, wherein the angular position switch members comprises plane contacts formed of a plurality of conductor units formed on each rotary disk rotating in response to the rotation of the reduction gear, and a plurality of stationary contacts arranged to make contact with the plane contacts.

8. The apparatus as claimed in claim 6, wherein said pair of conductor units are formed on one side surface of the rotary disk, the stationary contacts are arranged in sequence at the position corresponding to one same radius of the rotary disk from the minimum angular position toward the maximum angular position, and said pair of conductor units are formed of each conductor passage equal to a trace formed on the rotary disk at the stationary contact when the rotary disk is rotated.

9. The apparatus as claimed in claim 7, wherein said pair of conductor units are formed on one side surface of the rotary disk, the stationary contacts are arranged in sequence at the position corresponding to one same radius of the rotary disk from the minimum angular position toward the maximum angular position, and said pair of conductor units are formed of each conductor passage equal to a trace formed on the rotary disk at the stationary contact when the rotary disk is rotated.

* * * * *